(12) United States Patent
Marques et al.

(10) Patent No.: US 8,955,318 B2
(45) Date of Patent: Feb. 17, 2015

(54) TURBOCHARGER CARTRIDGE AND ENGINE CYLINDER HEAD ASSEMBLY

(75) Inventors: Manuel Marques, Richardmenil (FR); Michael Ladonnet, Drombrot sur Vair (FR); Alain Lombard, Vosges (FR); Johann Kurtzmann, Chavelot (FR)

(73) Assignee: Honeywell International Inc., Morristown, NJ (US)

( * ) Notice: Subject to any disclaimer, the term of this patent is extended or adjusted under 35 U.S.C. 154(b) by 486 days.

(21) Appl. No.: 13/447,851

(22) Filed: Apr. 16, 2012

(65) Prior Publication Data

US 2013/0269339 A1    Oct. 17, 2013

(51) Int. Cl.

| F02B 33/44 | (2006.01) |
|---|---|
| F04B 17/00 | (2006.01) |
| F04B 35/00 | (2006.01) |
| F01D 25/18 | (2006.01) |
| F02B 37/00 | (2006.01) |
| F01D 25/24 | (2006.01) |

(52) U.S. Cl.
CPC ............... *F02B 37/00* (2013.01); *F01D 25/24* (2013.01)
USPC .......................... 60/605.3; 417/407; 184/6.11

(58) Field of Classification Search
CPC .......... F02B 39/00; F02B 39/14; F02B 39/16; F02B 37/00; F02F 1/24; F02F 1/243; F01D 25/24; F01D 25/125; F01D 25/16; F01D 25/166; F01D 25/18; F01D 25/186; F02C 6/12; F16C 35/02; F16C 2360/24; F04D 29/62; F05D 2220/40; F01M 2011/021; Y02T 10/144
USPC ................. 60/605.3; 417/407; 184/6.11, 6.16
See application file for complete search history.

(56) References Cited

U.S. PATENT DOCUMENTS

| 3,270,951 A | 9/1966 | Reed |
| 4,075,849 A | 2/1978 | Richardson |
| 4,463,564 A | 8/1984 | McInerney |
| 4,613,288 A | 9/1986 | McInerney |

(Continued)

FOREIGN PATENT DOCUMENTS

| JP | 57-052624 A | 3/1982 |
| JP | 2002-303145 A | 10/2002 |

(Continued)

OTHER PUBLICATIONS

U.S. Appl. No. 61/422,485, filed Dec. 13, 2010.

(Continued)

*Primary Examiner* — Thai Ba Trieu
(74) *Attorney, Agent, or Firm* — John C. James (57) ABSTRACT

A turbocharger cartridge and engine cylinder head assembly includes a turbocharger cartridge having a center housing defining a bore therethrough, bearings housed in the bore, a shaft rotatably supported in the bearings, a compressor wheel affixed to one end of the shaft, and a turbine wheel affixed to an opposite end of the shaft. The engine cylinder head defines a receptacle in which the turbocharger cartridge is disposed. The cartridge defines a cartridge oil circuit and the engine cylinder head defines an engine oil circuit. An oil circuit connector plug is removably installed in a socket in the head, the plug defining a connector passage that mates up with an oil supply conduit in the engine cylinder head and with an oil supply passage in the center housing such that oil is conducted from the oil supply conduit through the connector passage to the bore.

8 Claims, 6 Drawing Sheets

(56) References Cited

U.S. PATENT DOCUMENTS

| | | | |
|---|---|---|---|
| 4,630,445 A | 12/1986 | Parker | |
| 4,655,040 A | 4/1987 | Parker | |
| 4,655,043 A | 4/1987 | McInerney | |
| 4,656,834 A | 4/1987 | Elpern | |
| 4,721,441 A | 1/1988 | Miyashita et al. | |
| 4,798,523 A * | 1/1989 | Glaser et al. | 417/407 |
| 4,815,184 A | 3/1989 | Johnston et al. | |
| 5,857,337 A | 1/1999 | Kawasaki | |
| 6,193,463 B1 | 2/2001 | Adeff et al. | |
| 7,089,737 B2 | 8/2006 | Claus | |
| 7,428,813 B2 | 9/2008 | Finger et al. | |
| 7,476,090 B2 * | 1/2009 | Wood | 60/605.3 |
| 7,637,106 B2 | 12/2009 | Hertweck et al. | |
| 7,946,118 B2 * | 5/2011 | Hippen et al. | 60/605.3 |
| 8,062,006 B2 | 11/2011 | Hummel et al. | |
| 8,092,162 B2 | 1/2012 | Masson et al. | |
| 8,209,983 B2 * | 7/2012 | Palazzolo et al. | 60/605.3 |
| 8,215,113 B2 * | 7/2012 | Hudson et al. | 60/605.3 |
| 8,234,867 B2 * | 8/2012 | Palazzolo et al. | 60/605.3 |
| 8,245,511 B2 * | 8/2012 | Cowland et al. | 60/605.3 |
| 8,572,963 B2 * | 11/2013 | Cuniberti et al. | 60/605.3 |
| 2005/0069427 A1 | 3/2005 | Roemuss et al. | |
| 2007/0081906 A1 * | 4/2007 | Wood | 60/605.3 |
| 2007/0234997 A1 * | 10/2007 | Prenger | 123/196 S |
| 2009/0031722 A1 | 2/2009 | An et al. | |
| 2009/0077966 A1 | 3/2009 | Lombard et al. | |
| 2009/0136368 A1 | 5/2009 | Arnold et al. | |
| 2009/0151327 A1 * | 6/2009 | Zimmermann | 60/280 |
| 2009/0226307 A1 | 9/2009 | Masson et al. | |
| 2010/0180592 A1 | 7/2010 | Williams et al. | |
| 2010/0322106 A1 | 12/2010 | Qiang | |
| 2011/0011085 A1 | 1/2011 | Garrett et al. | |
| 2011/0103936 A1 | 5/2011 | Lombard | |
| 2011/0171017 A1 | 7/2011 | Lingenauber et al. | |
| 2011/0173972 A1 | 7/2011 | Wade et al. | |
| 2011/0200422 A1 | 8/2011 | Gutknecht | |
| 2011/0268559 A1 | 11/2011 | Lombard et al. | |
| 2011/0302920 A1 * | 12/2011 | Cuniberti et al. | 60/605.3 |
| 2012/0011845 A1 | 1/2012 | Williams et al. | |
| 2012/0047887 A1 | 3/2012 | Petitjean et al. | |
| 2012/0148386 A1 | 6/2012 | Lombard | |
| 2012/0257966 A1 * | 10/2012 | Boening et al. | 415/229 |
| 2013/0071243 A1 | 3/2013 | Kocher et al. | |
| 2013/0149126 A1 | 6/2013 | Herrera et al. | |
| 2013/0202431 A1 | 8/2013 | Heidingsfelder et al. | |
| 2013/0205775 A1 * | 8/2013 | Begin et al. | 60/605.3 |
| 2013/0223995 A1 | 8/2013 | Lombard et al. | |
| 2013/0247566 A1 | 9/2013 | Lombard et al. | |
| 2013/0255252 A1 * | 10/2013 | Fonville et al. | 60/605.3 |
| 2013/0255253 A1 * | 10/2013 | Begin et al. | 60/605.3 |
| 2013/0287564 A1 * | 10/2013 | Fath et al. | 415/213.1 |
| 2013/0291540 A1 * | 11/2013 | Serres et al. | 60/605.1 |

FOREIGN PATENT DOCUMENTS

| | | |
|---|---|---|
| JP | 2006-194227 A | 7/2006 |
| JP | 2006-266244 A | 10/2006 |
| JP | 2010-038091 A | 2/2010 |
| JP | 2010-151283 A | 6/2010 |
| WO | WO 2010/085494 A1 | 7/2010 |
| WO | WO 2011/154874 A2 | 12/2011 |

OTHER PUBLICATIONS

Office Action from U.S. Appl. No. 13/425,943, dated Sep. 4, 2014.
Office Action from U.S. Appl. No. 13/425,891, dated Sep. 4, 2014.
International Search Report and Written Opinion for Application No. PCT/US2013/029770, dated Jun. 17, 2013.
International Search Report and Written Opinion for Application No. PCT/US2013/029319, dated Jun. 13, 2013.
International Search Report and Written Opinion for Application No. PCT/US2013/029537, dated Jun. 14, 2013.

* cited by examiner

TURBOCHARGER CARTRIDGE AND ENGINE CYLINDER HEAD ASSEMBLY

CROSS-REFERENCE TO RELATED APPLICATIONS

This application is related to U.S. patent application Ser. No. 13/425,943 filed on Mar. 21, 2012, and to U.S. patent application Ser. No. 13/425,891 filed on Mar. 21, 2012, both of which are currently pending.

BACKGROUND OF THE INVENTION

The present disclosure relates to exhaust gas-driven turbochargers, and particularly relates to turbocharger and engine cylinder head assemblies.

Increasingly, gasoline engines are being produced in the form of turbocharged engines. It would be desirable to provide a turbocharger that can be produced at lower cost without sacrificing performance. Production cost for a turbocharger for a gasoline engine is largely driven by the cost of the turbine housing.

BRIEF SUMMARY OF THE DISCLOSURE

The present disclosure addresses issues such as the one noted above.

In accordance with one embodiment described herein, a turbocharger cartridge and engine cylinder head assembly is provided, comprising:
  a turbocharger cartridge forming a unit that comprises at least a center housing rotating assembly, the center housing rotating assembly comprising a center housing defining a bore therethrough, bearings housed in the bore, a shaft rotatably supported in the bearings, a compressor wheel affixed to one end of the shaft, and a turbine wheel affixed to an opposite end of the shaft;
  an engine cylinder head defining a receptacle in which the turbocharger cartridge is disposed, a radially outer surface of the center housing confronting a radially inner surface of the receptacle;
  wherein the turbocharger cartridge defines a cartridge oil circuit including an oil supply passage and an oil drain each defined in the center housing, the oil supply passage extending from the radially outer surface of the center housing generally radially inwardly to the bore;
  wherein the engine cylinder head defines an engine oil circuit including an oil supply conduit and an oil drain conduit, the oil drain conduit mating up with the oil drain in the center housing, the oil supply conduit connecting with a socket defined in the engine cylinder head, the socket extending from an outer surface of the engine cylinder head generally radially inwardly and mating up with the oil supply passage in the center housing; and
  an oil circuit connector plug removably installed in the socket, the plug defining a connector passage that mates up with the oil supply conduit in the engine cylinder head and with the oil supply passage in the center housing such that oil is conducted from the oil supply conduit through the connector passage to the bore.

In one embodiment, the plug includes a distal portion that is received within the oil supply passage in the center housing. The distal portion of the plug can be externally threaded and the oil supply passage can be internally threaded, the plug being secured to the cartridge by a threaded connection between the externally threaded distal portion of the plug and the internally threaded oil supply passage.

In one embodiment, the oil supply passage in the center housing has a stepped configuration presenting an annular surface facing radially outwardly, and the plug has a stepped configuration presenting an annular surface facing radially inwardly. A sealing member is disposed between the annular surfaces of the oil supply passage and the plug, the sealing member being compressed between the annular surfaces when the threaded connection between the plug and the cartridge is tightened by rotation of the plug.

The connector passage of the plug can comprise a blind oil passage extending longitudinally of the plug from an opening at the distal end of the plug to a terminal point within the plug, and at least one transverse oil passage extending through an outer peripheral surface of the plug and connecting with the blind oil passage. The oil supply conduit of the engine cylinder head can be arranged to supply oil into the at least one transverse oil passage.

Sealing between the plug and the engine cylinder head can be provided by an outer seal (e.g., an O-ring encircling the plug) at a location radially outwardly of the at least one transverse oil passage, and by an inner seal between the plug and the engine cylinder head (e.g., an O-ring encircling the plug) at a location radially inwardly of the at least one transverse oil passage.

In one embodiment, the plug is unconstrained against radial movement of the plug relative to the engine cylinder head.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

DETAILED DESCRIPTION OF THE DRAWINGS

The present disclosure now will be described more fully hereinafter with reference to the accompanying drawings in which some but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

In the present specification and claims, the use the term "radial" and the like is with reference to the rotation axis of the turbocharger as defined by the bearings for the turbocharger shaft.

A turbocharger cartridge and engine cylinder head assembly 10 in accordance with one embodiment of the invention is depicted in FIGS. 1-6. The assembly 10 comprises an engine cylinder head 20 (illustrated only schematically) on which a turbocharger 30 is mounted. The engine cylinder head 20 comprises a casting that is configured to sit atop the engine block, above the engine cylinders. The head 20 typically houses components of the intake and exhaust valves for the cylinders and defines intake and exhaust passages through which intake air is delivered to the cylinders and exhaust gases are routed away from the cylinders, respectively. For each cylinder, the head defines at least one intake passage and at least one exhaust passage (not shown). The head is configured to route the exhaust gases produced in the engine cylinders through the exhaust passages into an exhaust manifold (not shown) that feeds exhaust gases to the turbine of the turbocharger.

The cylinder head 20 defines a housing member 40 as an integral part thereof. The head proper and the housing member collectively can be, for example, a one-piece casting. As further described below, the housing member 40 is configured to define a number of features that would conventionally be defined by separate housing members of the turbocharger 30.

Figure 3:
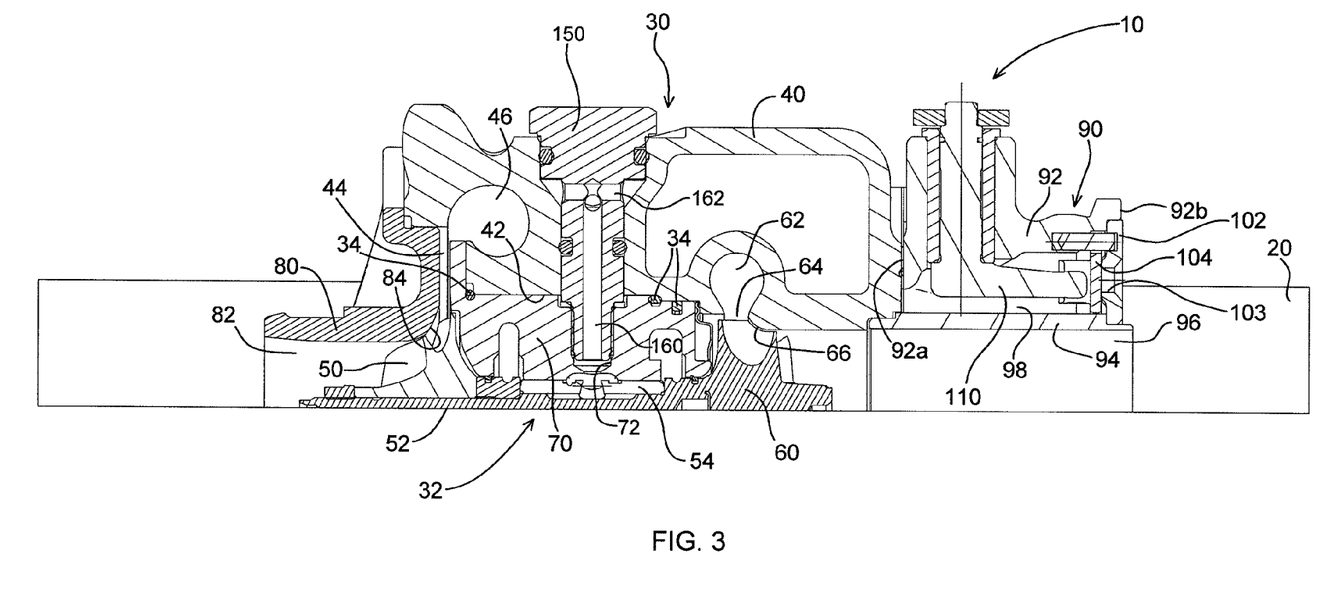
FIG. 3 is an axial cross-sectional view through the turbocharger cartridge and engine cylinder head assembly.
Figure 4:
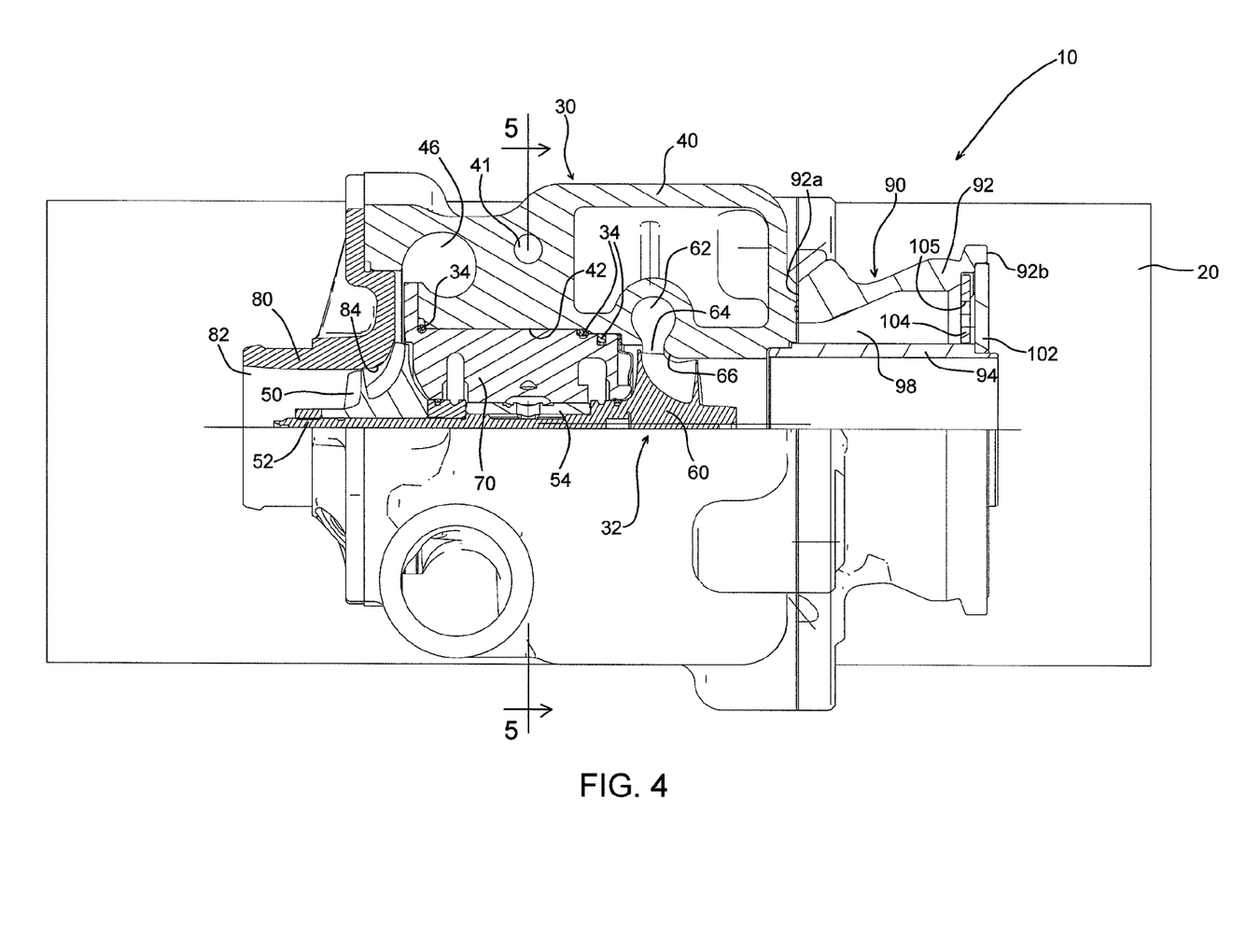
FIG. 4 is a front view of the assembly of FIG. 1, partly in section.

With reference to FIGS. 3 and 4, the turbocharger 30 includes a "cartridge" 32, also referred to herein as a center housing rotating assembly (CHRA). The CHRA 32 comprises a compressor wheel 50 affixed to one end of a shaft 52 and a turbine wheel 60 affixed to the opposite end of the shaft 52, bearings 54 that rotatably support the shaft 52, and a center housing 70 that houses the bearings 54 and defines an oil supply passage 72 for supplying oil to the bearings, an oil drain 74 for scavenging oil from the bearings, and (optionally) water passages for circulating coolant through the center housing. The oil supply to the CHRA 32 is further discussed below in connection with FIGS. 5 and 6.

In accordance with the invention, the housing member 40 of the cylinder head 20 defines a receptacle 42 that receives the CHRA 32. The receptacle 42 is a stepped, generally cylindrical bore extending axially through the housing member 40. The receptacle is configured to allow the CHRA 32 to be slid axially into the receptacle, compressor wheel first (i.e., to the left in FIG. 3). Thus, the receptacle 42 for example can have various portions of differing inside diameters, with steps transitioning between adjacent portions of different diameters. The steps are turbine-side-facing, i.e., each step faces axially toward the turbine side of the CHRA (to the right in FIG. 3), and thus the receptacle becomes progressively smaller in diameter in the direction from the turbine toward the compressor. The center housing 70 of the CHRA 32 is correspondingly stepped to substantially match the stepped configuration of the receptacle 42. There are seals (e.g., O-rings) 34 between the center housing 70 and the receptacle 42 for sealing the interface therebetween and to separate or isolate the oil passages and the water passages (if present) in the center housing.

The CHRA 32 further includes a wastegate or turbine bypass unit 90. The wastegate unit is operable to allow some or substantially all of the exhaust gases to bypass the turbine wheel 60 under certain operating conditions. In the illustrated embodiment, the wastegate unit 90 is a rotary turbine bypass (RTB) unit generally as described in Applicant's co-pending U.S. application Ser. No. 12/611,816 filed on Nov. 3, 2009, application Ser. No. 12/711,434 filed on Apr. 30, 2010, and application Ser. No. 12/966,343 filed Dec. 13, 2010, the entire disclosures of said applications being hereby incorporated herein by reference.

With reference to FIG. 3, the RTB unit 90 includes a valve housing assembly comprising a main housing 92 (also referred to herein as a wastegate housing) and a housing insert 94. The main housing 92 defines a passage extending axially through the main housing. The housing insert 94 comprises a generally tubular member that is disposed in the passage of the main housing such that the interior of the housing insert 94 defines a central flow passage 96, and an annular space between the outer surface of the housing insert 94 and an inner surface of the main housing 92 defines an annular flow passage (also referred to herein as a wastegate passage) 98 that surrounds the central flow passage 96. The main housing 92 further defines one or more flanges 93 (FIG. 1) configured to be affixed to the housing member 40 of the engine cylinder head, such as by threaded fasteners (not shown) passing through apertures in the flange(s) 93 and into corresponding apertures in the housing member 40, in order to secure the RTB unit 90 to the housing member 40.

The RTB unit 90 further comprises a stationary valve seat 102 and a rotary valve member 104 in abutting engagement with the valve seat. The valve seat 102 and valve member 104 are arranged in the annular space between the main housing 92 and the housing insert 94. The valve member 104 is prevented from moving axially upstream by a shoulder defined by the main housing 92, although during operation pressure of the exhaust gas urges the valve member 104 in the downstream direction. The valve member 104 is not constrained by the main housing but is free to rotate about its axis and to move axially against the valve seat 102. The valve seat 102 is prevented from moving axially, radially, or rotationally. The valve seat 102 is a generally flat ring-shaped or annular member having a plurality of orifices 103 (FIG. 4) circumferentially spaced apart about a circumference of the valve seat, the orifices 103 extending generally axially between the upstream and downstream faces of the valve seat. The orifices 103 can be uniformly or non-uniformly spaced about the circumference of the valve seat.

The rotary valve member 104 is a generally flat ring-shaped or annular member having a plurality of orifices (not visible in the section of FIG. 3) circumferentially spaced apart about a circumference of the valve member, the orifices extending generally axially between the upstream and downstream faces of the valve member. The main housing 92 and the housing insert 94 both define substantially circular bearing surfaces for the outer and inner edges of the rotary valve member 104 and there are clearances therebetween, so that the valve member 104 can be rotated in one direction or the opposite direction about its central longitudinal axis in order to vary a degree of alignment between the valve member orifices and the valve seat orifices 103.

Figure 1:
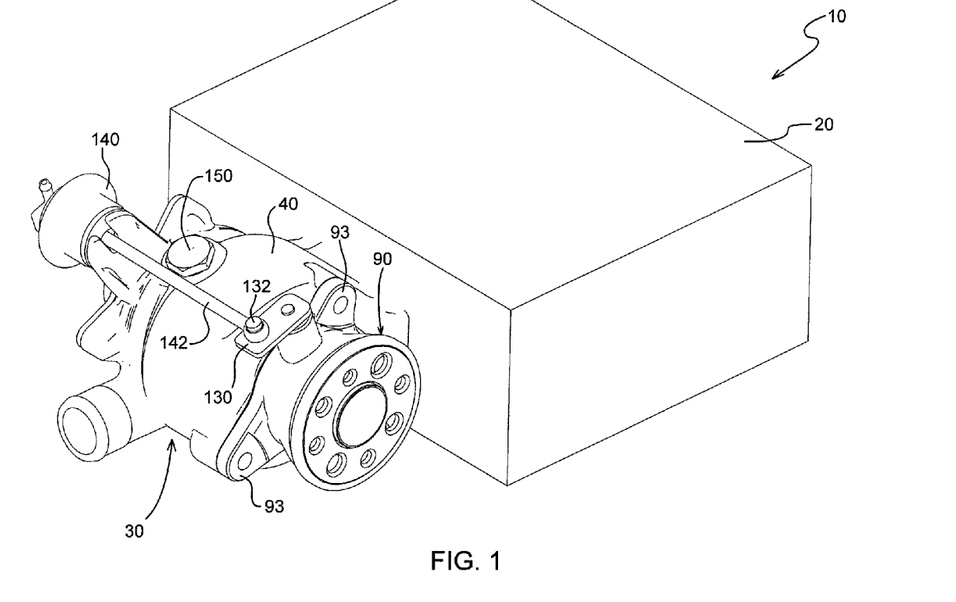
FIG. 1 is a perspective view of a turbocharger cartridge and engine cylinder head assembly in accordance with one embodiment of the present invention.
Figure 2:
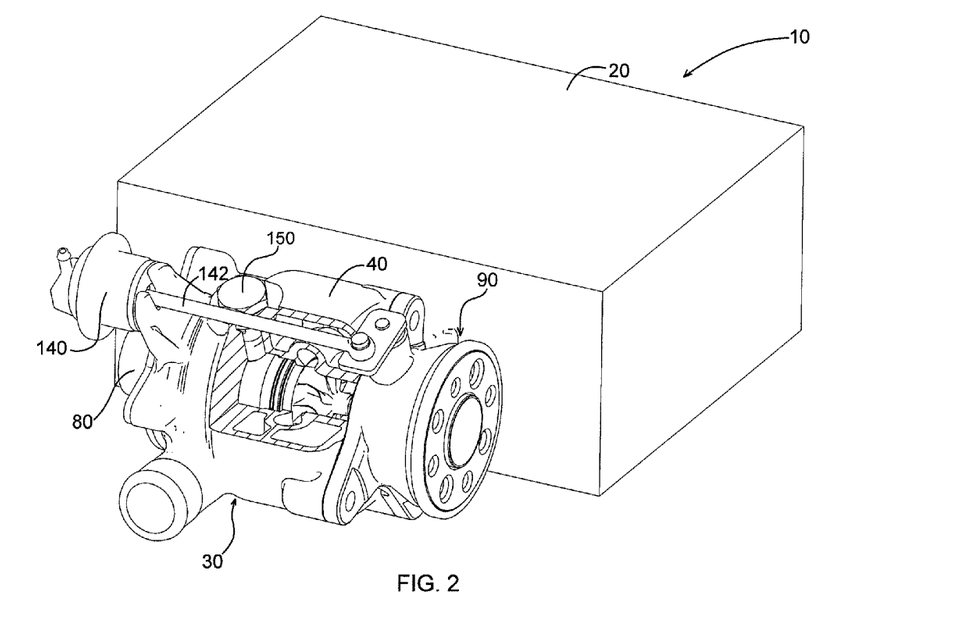
FIG. 2 is a perspective view of the turbocharger cartridge and engine cylinder head assembly of FIG. 1, partly in section.

The valve member 104 is engaged by the distal end of an L-shaped drive arm 110 a portion of which passes through a bushing installed in a bore defined in the main housing 92, the bore connecting with the annular flow passage 98. The proximal (radially outer) end of the drive arm is located outside the main housing 92 and is rigidly affixed to a link 130 (FIG. 1). An actuator 140 is provided for rotating the drive arm 110. The link 130 has a connecting member 132 that is offset from the rotation axis of the drive arm 110 and that is coupled to an actuator rod 142 of the actuator 140 such that extension of the actuator rod causes the link 130 to rotate the drive arm in one direction and retraction of the actuator rod causes the link to rotate the drive arm in the opposite direction. As a result, the drive arm causes the valve member 104 to be rotated in one direction or the opposite direction about its axis.

With reference to FIG. 3, the housing member 40 of the engine cylinder head 20 defines a diffuser 44 for receiving and diffusing pressurized air from the compressor wheel 50, a compressor volute 46 that receives the air from the diffuser, and a turbine volute 62 for receiving exhaust gas from an engine. These features conventionally would be defined by compressor and turbine housings of the turbocharger. The assembly also includes a compressor contour plug 80 that defines a compressor inlet 82 and a compressor contour 84. In the illustrated embodiment, the plug 80 is formed separately from the housing member 40 and is attached to the housing member by threaded fasteners (not shown). Alternatively, however, the plug 80 could be formed integrally as part of the housing member 40.

The housing member 92 of the wastegate unit 90 includes a portion 92a that is received into the receptacle 42 of the engine cylinder housing member 40 and that defines a turbine nozzle 64 and a turbine contour 66, as best seen in FIG. 3. The turbine nozzle comprises an aperture extending substantially 360 degrees about the housing member 92 and extending from a radially outer surface to a radially inner surface of the housing member. An array of circumferentially spaced vanes 65 extend across the turbine nozzle 64. The vanes 65 provide a flow-guiding function for guiding the exhaust gas into the turbine wheel 60 in an advantageous direction. In the illustrated embodiment, the wastegate housing 92 also includes a portion 92b that defines a bore into which an end of the center housing 70 is received. A separate heat shield 63 is captured between the end of the center housing and the portion 92b of the wastegate housing 92.

While a wastegate in the form of a rotary valve 90 is described and illustrated, the wastegate alternatively can be a non-rotary valve such as a poppet valve. The housing member of the poppet valve can include the above-noted features defining the turbine nozzle 64, vanes 65, and turbine contour 66.

The housing member 40 of the engine cylinder head 20 defines an integral wastegate passage (not shown) arranged to be in communication with the annular wastegate passage 98 (FIG. 3) of the wastegate unit 90. When the wastegate unit 90 is closed, exhaust gas is substantially prevented from flowing through the wastegate passage 48 and the wastegate passage 98, such that exhaust gas from the exhaust gas manifold is directed into the turbine wheel 60. When the wastegate unit 90 is partially or fully open, some or most of the exhaust gas bypasses the turbine wheel.

Thus, a significant advantage of the turbocharger cartridge and engine cylinder head assembly 10 described herein is that the CHRA 32 having the wastegate unit 90 constitutes a single component that can simply be inserted into the receptacle 42 defined by the housing member 40 of the cylinder head 20. The assembly is substantially completed by affixing the wastegate housing 92 and the compressor contour plug 80 to the housing member 40 of the cylinder head, such as with threaded fasteners (not shown). Integration of certain features into the engine cylinder head as described above thereby allows a substantial simplification of the turbocharger components to be supplied to the engine manufacturer or assembler.

Figure 5:
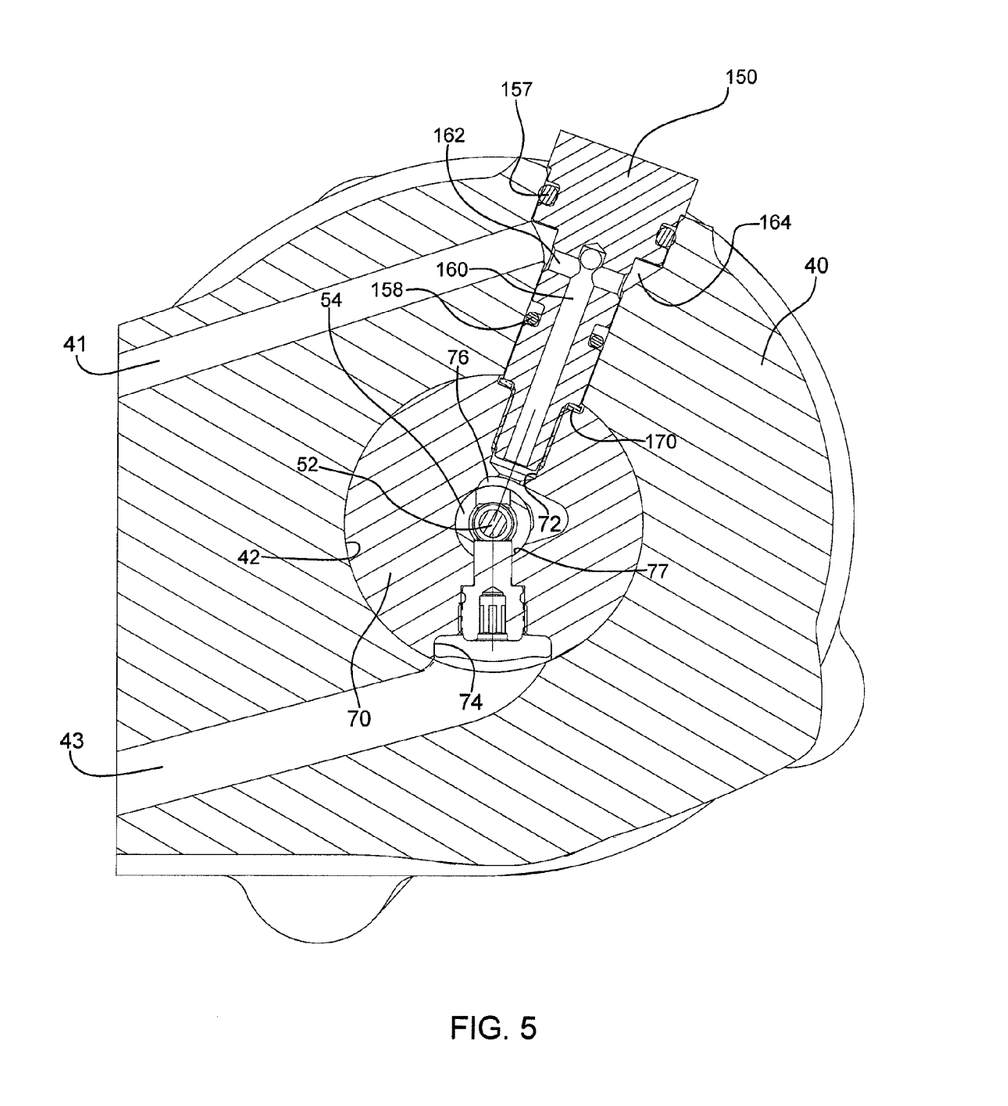
FIG. 5 is a transverse cross-sectional view along line 5-5 in FIG. 4.
Figure 6:
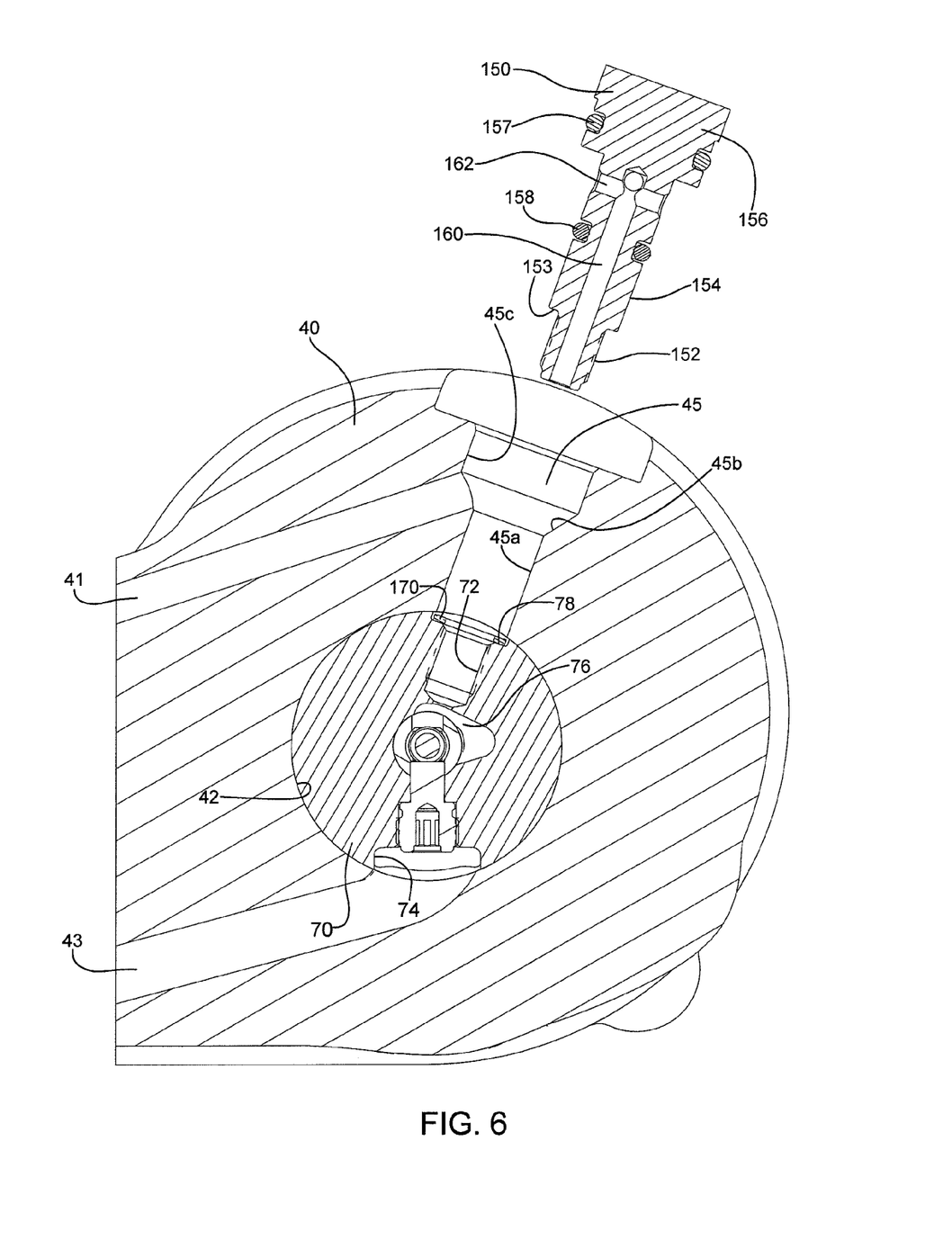
FIG. 6 is a view similar to FIG. 4, but with the oil connection plug shown removed from the socket in the engine cylinder head.

The present invention concerns how to connect the engine's oil circuit to the oil circuit of the cartridge 32 so that lubrication and cooling of the bearings 54 can be accomplished. With reference to FIGS. 4-6, the engine oil circuit includes an oil supply conduit 41 defined in the housing member 40 of the engine cylinder head 20 for supplying oil to the cartridge 32, and an oil drain conduit 43 for receiving oil that has lubricated and cooled the bearings 54. The oil drain conduit 43 mates up with the oil drain 74 defined in the center housing 70. The oil supply conduit 41 is connected to the oil supply passage 72 in the center housing 70 by way of an oil connector plug 150. The plug 150 is removably installed in a socket 45 defined in the housing member 40 of the engine cylinder head 20. The oil supply conduit 41 leads into the socket 45. The socket 45 is a stepped bore that extends generally radially inwardly through an outer surface of the housing member 40 of the engine cylinder head 20, all the way through to a radially inner surface of the receptacle 42 in the cylinder head that receives the center housing 70 of the turbocharger cartridge. The socket 45 mates up with the oil supply passage 72 in the center housing 70. The oil supply passage 72 is also a stepped bore that extends generally radially inwardly through a radially outer surface of the center housing 70, all the way through to a cavity 76 that connects to a bore 77 in the center housing that contains the bearings 54 for the shaft 52.

As best seen in FIG. 6, the oil supply passage 72 in the center housing has a generally cylindrical portion that is internally threaded. Radially outwardly of the threaded portion of the passage 72, the passage widens and presents an annular surface 78 that faces radially outwardly. A sealing member 170 in the form of a ring sits on the annular surface 78. The sealing member 160 can be, for example, a ring made of copper or any other suitable material.

The plug 150 has a generally cylindrical distal portion 152 that is externally threaded for engaging the internally threaded portion of the oil supply passage 72, such that when the plug is inserted into the socket 45 and rotated, a threaded connection is formed between the plug and the center housing 70. The plug has a stepped configuration and thus presents an annular surface 153 located radially outwardly of the threaded portion 152 and facing radially inwardly. When the threaded connection between the plug and center housing is formed as described above, the sealing member 170 is compressed between the annular surface 153 of the plug and the annular surface 78 of the center housing.

The socket 45 in the housing member 40 of the engine cylinder head 20 is essentially a countersunk bore having a generally cylindrical portion 45a of relatively small diameter, and a widening flared (generally conical) portion 45b radially outward of the small-diameter portion 45a and leading to a generally cylindrical larger-diameter portion 45c for accommodating an enlarged head 156 of the plug 150. An outer seal 157 (e.g., an O-ring) is disposed between the peripheral surface of the head 156 and an inner surface of the larger-diameter portion 45c of the socket for sealing the interface therebetween. The plug 150 has a generally cylindrical portion 154 slightly smaller in diameter than the small-diameter portion 45a of the socket 45. An inner seal 158 (e.g., an O-ring) is disposed between the peripheral surface of the portion 154 and the inner surface of the socket portion 45a for sealing the interface therebetween.

The oil supply conduit 41 in the housing member 40 of the engine cylinder head 20 leads into the socket 45 at the location of the flared portion 45b. The plug 150 defines an oil connector passage comprising a blind oil passage 160 extending longitudinally of the plug from an opening at the distal end of the plug to a terminal point within the plug, and at least one transverse oil passage 162 extending through an outer peripheral surface of the plug and connecting with the blind oil passage 160. The oil supply conduit 41 of the engine cylinder head is arranged to supply oil into the at least one transverse oil passage 162. In the illustrated embodiment, there are a plurality of separate transverse oil passages 162 that radiate out from the central longitudinal oil passage 160. A generally annular oil-receiving space 164 (FIG. 5) is defined between the flared portion 45b of the socket 45 and the peripheral surface of the plug portion 154, and the transverse oil passages 162 all receive oil from this annular space. The space 164 is sealed by the outer seal 157 and inner seal 158.

It will be noted that the plug 150 is unconstrained against radial movement of the plug relative to the housing member 40 of the engine cylinder head 20. While the plug has a threaded connection to the center housing 70 as previously described, the plug can undergo some amount of relative radial movement within the socket 45 in the cylinder head, and the seals 157, 158 maintain sealing of the annular oil space 164 despite such movement. Such relative movement may arise, for example, from differential thermal expansion or contraction between the plug and cylinder head.

Many modifications and other embodiments of the inventions set forth herein will come to mind to one skilled in the art to which these inventions pertain having the benefit of the teachings presented in the foregoing descriptions and the associated drawings. For example, while the invention has been described in connection with a particular configuration of engine cylinder head and turbocharger cartridge assembly, the oil connector plug aspect of the invention is applicable to such assemblies having other configurations. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. A turbocharger cartridge and engine cylinder head assembly, comprising:
    a turbocharger cartridge forming a unit that comprises at least a center housing rotating assembly, the center housing rotating assembly comprising a center housing defining a bore therethrough, bearings housed in the bore, a shaft rotatably supported in the bearings, a compressor wheel affixed to one end of the shaft, and a turbine wheel affixed to an opposite end of the shaft;
    an engine cylinder head defining a receptacle in which the turbocharger cartridge is disposed, a radially outer surface of the center housing confronting a radially inner surface of the receptacle;
    wherein the turbocharger cartridge defines a cartridge oil circuit including an oil supply passage and an oil drain each defined in the center housing, the oil supply passage extending from the radially outer surface of the center housing generally radially inwardly to the bore;
    wherein the engine cylinder head defines an engine oil circuit including an oil supply conduit and an oil drain conduit, the oil drain conduit mating up with the oil drain in the center housing, the oil supply conduit connecting with a socket defined in the engine cylinder head, the socket extending from an outer surface of the engine cylinder head generally radially inwardly and mating up with the oil supply passage in the center housing; and
    an oil circuit connector plug removably installed in the socket, the plug defining a connector passage that mates up with the oil supply conduit in the engine cylinder head and with the oil supply passage in the center housing such that oil is conducted from the oil supply conduit through the connector passage to the bore.

2. The turbocharger cartridge and engine cylinder head assembly of claim 1, wherein the plug includes a distal portion that is received within the oil supply passage in the center housing.

3. The turbocharger cartridge and engine cylinder head assembly of claim 2, wherein the distal portion of the plug is externally threaded and the oil supply passage is internally threaded, the plug being secured to the cartridge by a threaded connection between the externally threaded distal portion of the plug and the internally threaded oil supply passage.

4. The turbocharger cartridge and engine cylinder head assembly of claim 3, wherein the oil supply passage in the center housing has a stepped configuration presenting an annular surface facing radially outwardly, and the plug has a stepped configuration presenting an annular surface facing radially inwardly, and further comprising a sealing member disposed between the annular surfaces of the oil supply passage and the plug, the sealing member being compressed between the annular surfaces when the threaded connection between the plug and the cartridge is tightened by rotation of the plug.

5. The turbocharger cartridge and engine cylinder head assembly of claim 4, wherein the connector passage of the plug comprises a blind oil passage extending longitudinally of the plug from an opening at the distal end of the plug to a terminal point within the plug, and at least one transverse oil passage extending through an outer peripheral surface of the plug and connecting with the blind oil passage, and wherein the oil supply conduit of the engine cylinder head is arranged to supply oil into the at least one transverse oil passage.

6. The turbocharger cartridge and engine cylinder head assembly of claim 5, further comprising an outer seal between the plug and the engine cylinder head at a location radially outwardly of the at least one transverse oil passage.

7. The turbocharger cartridge and engine cylinder head assembly of claim 4, further comprising an inner seal between the plug and the engine cylinder head at a location radially inwardly of the at least one transverse oil passage.

8. The turbocharger cartridge and engine cylinder head assembly of claim 3, wherein the plug is unconstrained against radial movement of the plug relative to the engine cylinder head.

* * * * *